United States Patent
Bushnell et al.

(10) Patent No.: US 8,125,110 B2
(45) Date of Patent: Feb. 28, 2012

(54) TWO-STAGE COOLING FAN FOR AN ELECTRIC GENERATOR

(75) Inventors: Peter R. Bushnell, Cazenovia, NY (US);
Jason A. Gough, Marcellus, NY (US);
Curt B. Winter, Franklin, WI (US);
Stephen Stopyra, Syracuse, NY (US)

(73) Assignee: Carrier Corporation, Farmington, CT (US)

( * ) Notice: Subject to any disclaimer, the term of this patent is extended or adjusted under 35 U.S.C. 154(b) by 261 days.

(21) Appl. No.: 12/602,897

(22) PCT Filed: Jun. 12, 2007

(86) PCT No.: PCT/US2007/013750
§ 371 (c)(1),
(2), (4) Date: Dec. 3, 2009

(87) PCT Pub. No.: WO2008/156438
PCT Pub. Date: Dec. 24, 2008

(65) Prior Publication Data
US 2010/0176603 A1    Jul. 15, 2010

(51) Int. Cl.
*H02K 7/18* (2006.01)
(52) U.S. Cl. .......................................... 310/63; 290/1 B
(58) Field of Classification Search ........... 310/62, 310/63, 60 R, 59, 52; 290/1 B
See application file for complete search history.

(56) References Cited

U.S. PATENT DOCUMENTS

| | | | | |
|---|---|---|---|---|
| 2,690,513 | A | * | 9/1954 | Tamm .............................. 310/62 |
| 3,215,876 | A | | 11/1965 | Nichols et al. |
| 3,263,909 | A | | 8/1966 | Mazepa |
| 3,643,119 | A | * | 2/1972 | Lukens ........................ 310/60 R |
| 3,749,953 | A | * | 7/1973 | Baumann et al. ................ 310/62 |
| 4,562,367 | A | * | 12/1985 | Kumatani ........................ 310/62 |
| 4,908,538 | A | * | 3/1990 | Geberth, Jr. .................... 310/59 |
| 5,925,947 | A | * | 7/1999 | Kajiwara et al. ................ 310/64 |
| 6,144,121 | A | * | 11/2000 | Ishida et al. .................... 310/50 |
| 6,411,000 | B1 | * | 6/2002 | Rew ................................ 310/62 |
| 6,586,853 | B2 | | 7/2003 | Ishida et al. |
| 6,700,235 | B1 | * | 3/2004 | McAfee .......................... 310/52 |
| 6,935,838 | B1 | | 8/2005 | Wang |
| 7,023,101 | B2 | * | 4/2006 | Wang ............................ 290/1 A |
| 7,129,604 | B1 | | 10/2006 | Wang |

OTHER PUBLICATIONS

International Search Report and Written Opinion mailed Aug. 18, 2008 (8 pgs.).
International Preliminary Report on Patentability mailed Dec. 30, 2009 (5 pgs.).

\* cited by examiner

*Primary Examiner* — Dang D Le
(74) *Attorney, Agent, or Firm* — Cantor Colburn LLP

(57) ABSTRACT

An engine driven generator (17) is provided with first and second stage fans (41,42) at one end thereof. The two-stage fan system draws in ambient air and forces it through the generator windings (38) and rotor-stator air gap (37,39) for the purpose of improving generator cooling. Stationary guide vanes (49) are disposed between the two fans (41,42) for the purpose of de-swirling the flow therebetween. The fans are of the centrifugal type and are preferably backward curved.

18 Claims, 2 Drawing Sheets

TWO-STAGE COOLING FAN FOR AN ELECTRIC GENERATOR

BACKGROUND OF THE INVENTION

This invention relates generally to transport refrigeration systems and, more particularly, to the cooling of an engine driven electric generator therefor.

Generally, transport refrigeration systems such as those used on truck trailers, have employed belt driven and/or mechanically linked, shaft driven compressor units and/or belt driven, or otherwise mechanically linked, fan powering systems. That is, the unit engine, such as a diesel engine, is mechanically connected to drive both the compressor unit(s) and the unit refrigeration systems fans and other components.

A significant improvement to such an arrangement was a so called "all electric" transport refrigeration system as described in U.S. Pat. No. 6,223,546, assigned to the assignee of the present invention. In such a unit, a generator is mechanically connected to the system engine and is used to generate the electrical power needed to drive the compressor and the various refrigeration system fans and other components.

Heretofore, such an engine driven generator has been cooled by a single stage centrifugal fan disposed on one end thereof and adapted to circulate air over the stator and armature components for the cooling thereof.

Relatively low engine speeds are desired in trailer refrigeration systems in order to attain low fuel burn rates. This limitation on shaft speed results in relatively low pressure rise capability from a single stage fan. Yet, high pressure rise is needed to drive flow through the generator windings and rotor-stator air gap. System space constraints make large cooling fans or push-pull fan options impractical.

Augmentation of a cooling fan by the use of a second fan in cooling rotating machinery as shown in U.S. Pat. Nos. 6,700,235 and 7,129,604. However, the fans are mounted at opposite ends of the generator such that one of the fans is blowing cooler air across the rotating machinery, while the other fan is drawing warmer air away from the rotating machinery. This is disadvantageous since the warmer air is less dense and therefore results in reduced air mass flow rate.

SUMMARY OF THE INVENTION

Briefly, in accordance with one aspect of the invention, a two stage centrifugal fan is drivingly connected to one end of the rotor of an engine driven generator so as to provide relatively high pressure air at relatively modest fan tip speeds to cool the stator and rotor of the generator.

By another aspect of the invention, stationary guide vanes are placed between the two stages to control the flow from one stage to the next.

By yet another aspect of the invention, the fans are of the centrifugal type.

By yet another aspect of the invention, the centrifugal fans are backward curved.

In the drawings as hereinafter described, a preferred embodiment is depicted; however, various other modifications and alternate constructions can be made thereto without departing from the spirit and scope of the invention.

DESCRIPTION OF THE PREFERRED EMBODIMENT

Figure 1:
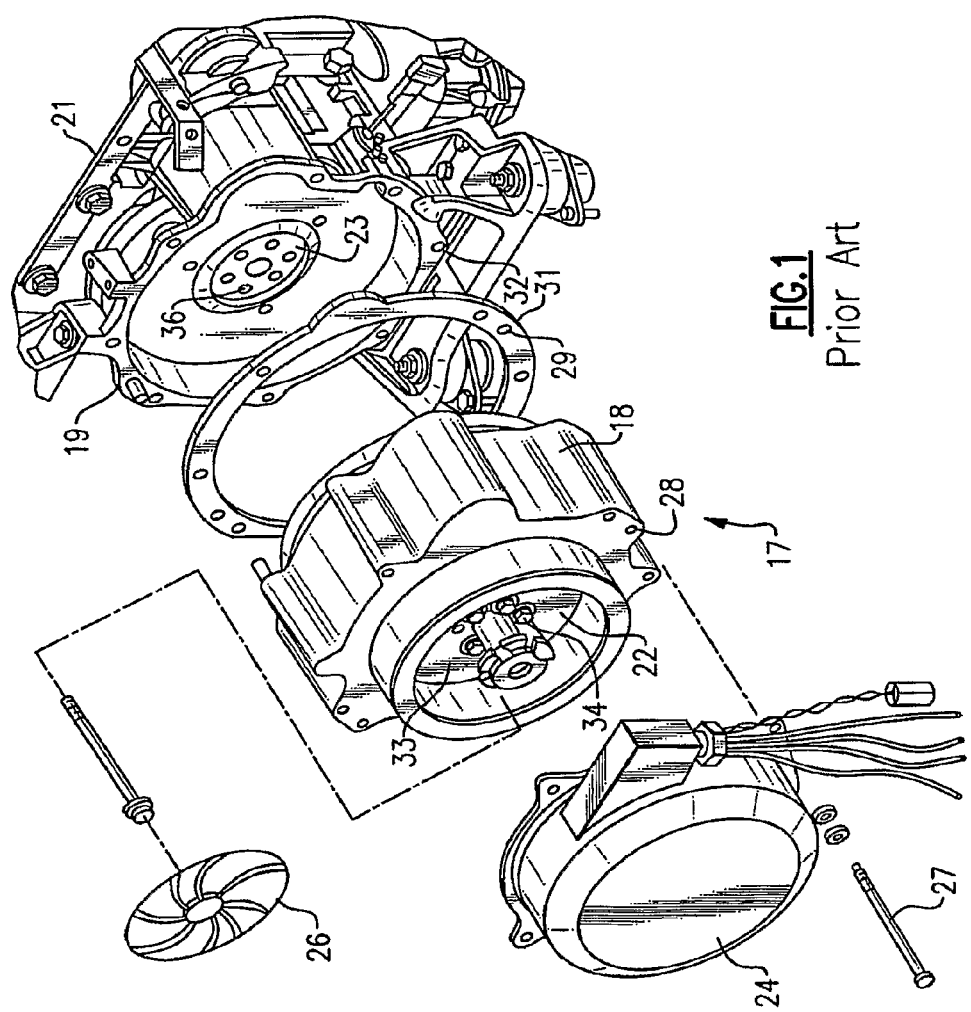
FIG. 1 is an exploded perspective view of an engine driven generator in accordance with the prior art.

FIG. 1 depicts a unitary engine driven generator which is cooled by the circulation of air in accordance with the prior art. The generator 17 includes an outer stator assembly 18 that is fixedly attached to the bell housing 19 of a suitable prime mover such as a diesel engine 21. A rotor assembly 22 is affixed directly to the engine flywheel 23 to create a continuous drive connection between the engine drive shaft, the engine flywheel and the rotor assembly 22 of the generator 17. A cover 24 and a generator cooling fan 26 have been removed to show the details of the rotor assembly 22.

The outer stator assembly 18 includes a core section which may be fabricated from ferrous laminations or powdered metal. A main winding that provides primary power to the refrigeration system and an auxiliary winding that is electrically connected to the battery charging device are disposed in slots in the stator core in the conventional manner. Attachment of the stator assembly 18 to the bell housing 19 is accomplished by use of a series of elongated threaded fasteners 27 passing through mating openings 28 in the stator core. The fasteners 27 in turn pass through axially aligned openings 29 provided in an adaptor plate 31 and thence into, axially aligned threaded openings 32 in the bell housing 19.

The rotor assembly 22 includes a steel rotor hub 33 having a plurality of axial openings therethrough which are adapted to receive a plurality of elongated threaded fasteners 34 therethrough. The threaded fasteners 34 are adapted to be received in axially aligned threaded openings 36 in the engine flywheel 23 to provide the integral connection between the rotor assembly 22 and the engine flywheel 23 and drive shaft.

In operation, the diesel engine 21 drives the flywheel 23 and the rotor assembly 22 with its associated rotor magnets, thereby inducing in the stator windings, synchronous voltages in a manner well familiar to those skilled in the art of synchronous generator design. Other details of the prior art system are shown and described in U.S. Pat. No. 6,223,564, assigned to the assignee of the present invention and incorporated herein by reference.

It should be understood that while some cooling of the generator 17 occurs by radiation from the outer stator assembly 18, the primary cooling function is accomplished by the fan 26 which is attached to and driven by the rotor assembly 22 to bring air in through the cover 24 and circulate it through both the stator windings and the rotor. While the stator windings develop a significant amount of heat and require the cooling air to prevent them from reaching excessive temperatures and being damaged thereby, it is also necessary to cool the rotor in order to prevent the permanent magnets from demagnetizing. In this regard, the applicants have found that it is difficult to force air through the rotor because of the high airflow resistance imposed by the tight rotor-stator air-gap and other restrictive flow-path elements. The applicants have found this to be further complicated by limitations on the rotational speed of the engine-generator-fan system.

Figure 2:
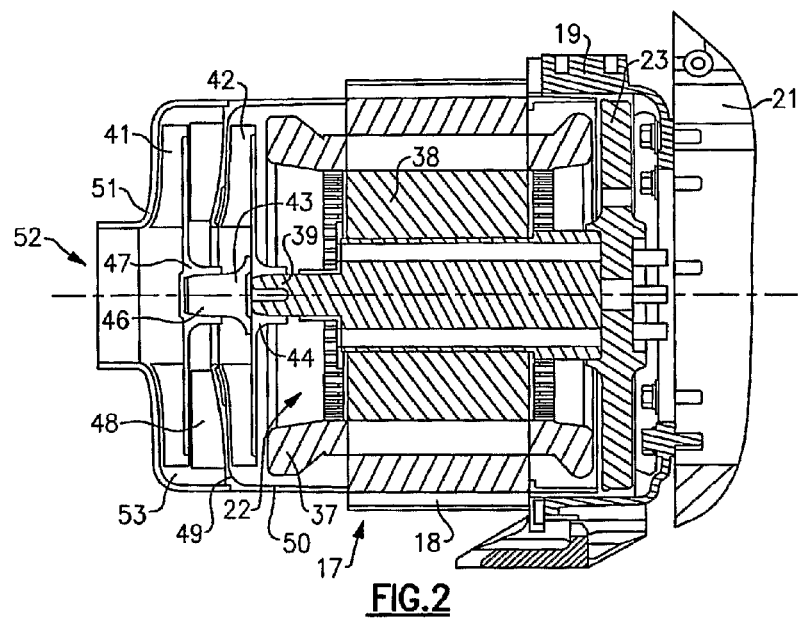
FIG. 2 is a longitudinal sectional view of an engine driven generator in accordance with the present invention.
Figure 3:
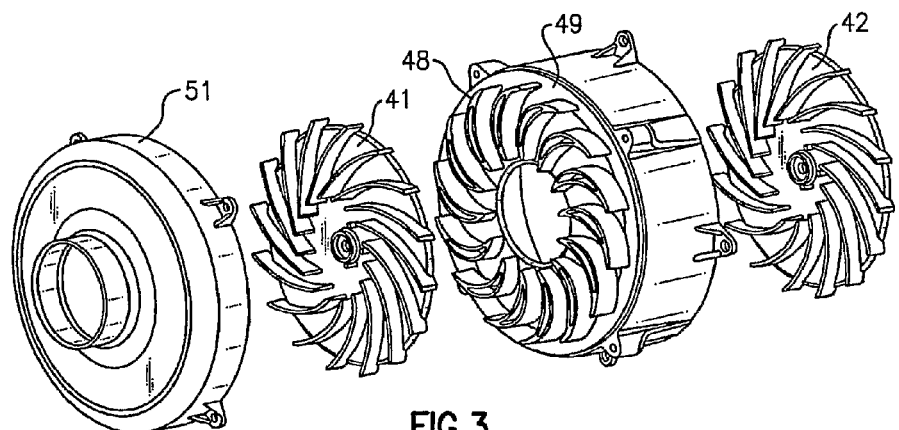
FIG. 3 is an exploded view of the two-stage cooling fan in accordance with the present invention.

Referring now to FIGS. 2 and 3, a generator 17 is shown to include a prime mover 21 drivingly connected to a rotor assembly 22, with a flywheel 23 mechanically connected therebetween. An outer stator assembly or casing 18 and an inner stator assembly 37 are stationary and are supported in a cantilevered manner by way of the bell housing 19.

The rotor assembly 22 includes an armature 38 mounted on a shaft 39 for rotation by the prime mover 21 within the inert stator assembly 37 to thereby generate electricity. The armature 38 and its shaft 39 are also mounted in a cantilevered fashion so as to not include any bearings.

A pair of centrifugal first and second stage fans 41 and 42 are mounted, in series, to the shaft 39 so as to be rotated at the same rotational speed as the armature 38. This connection is made by way of a hub 43. That is, the hub 43 forms the central body portion of the second stage fan 42 and includes a female portion 44 which is connected to the drive shaft 39 as shown, and a male portion 46 on which the hub 47 of the first stage fan 41 is mounted. Other fan-shaft arrangements may be envisioned for the system such as double-stepped or double-tapered shafts to accommodate the two-stage assembly.

Mounted between the two fans 41 and 42 are a plurality of radially extending guide vanes 48 which are mounted by the associated second stage casing and inlet assembly 49 to the support structure 50 and the outer stator assembly 18. The guide vanes 48 are stationary and act to remove the swirl from the air flowing inwardly from the first stage fan 41 before it arrives to the second stage fan 42. The guide vanes are also known as stator vanes. An inlet casing 51 with an opening 52 is attached to the support structure 49 and acts to form an isolating chamber 53 around the first and second stage fans 41 and 42 and their associated guide vanes 48.

In operation, the first and second stage fans 41 and 42 are rotated at a constant speed by way of the shaft 39 such that ambient air is drawn into the opening 52 and passed through the first stage fan 41 which raises the pressure to an intermediate level. The air then passes through the guide vanes 48, which act to remove the swirl and orient the flow in the radial direction. The flow then passes through the second stage fan 42, which acts to increase the pressure to a higher pressure, with the higher pressure air then passing through the various openings in the inner stator assembly 37 and the armature 38 to provide cooling thereto. The air then passes out of the generator at a series of openings 50 around the generator periphery. The first and second stage fans 41 and 42 are preferably of the backward curved type, but may be of any form while remaining in the scope of the present invention.

While certain preferred embodiments of the present invention have been disclosed in detail, it is to be understood that various modifications in its structure may be adopted without departing from the spirit and scope of the following claims.

We claim:

1. Cooling apparatus for an engine driven generator having a stator and a shaft mounted rotor for generating electrical power, comprising:
    a first stage fan connected to and driven by said rotor for drawing in ambient air and for moving it toward said generator;
    a plurality of guide vanes disposed downstream of said first stage fan for receiving the airflow therefrom and causing it to change flow direction to a generally radial flow direction; and
    a second stage fan connected and driven by said rotor, said second stage fan being disposed axially downstream of said plurality of guide vanes and for receiving the flow of air therefrom and moving it over said stator and rotor for cooling thereof.

2. Cooling apparatus as set forth in claim 1 wherein said first stage fan is of the centrifugal type.

3. Cooling apparatus as set forth in claim 2 wherein said first stage fan is of the backward curved type.

4. Cooling apparatus as set forth in claim 1 wherein said second stage fan is of the centrifugal type.

5. Cooling apparatus as set forth in claim 4 wherein said second stage fan is of the backward curved type.

6. Cooling apparatus as set forth in claim 1 wherein said engine driven generator is integrally mounted to a drive engine.

7. Cooling apparatus as set forth in claim 6 wherein said generator is cantilevered from said engine and has no bearings of its own.

8. A method of cooling an engine driven generator of the type having a stator, a rotary shaft, and a rotor supported for rotation on the rotary shaft within the stator, comprising the steps of:
    providing an air inlet and at least one air outlet;
    providing a first stage fan for drawing ambient air into said air inlet and moving it toward said stator and rotor;
    providing a plurality of guide vanes downstream of said first stage fan for receiving the flow of air therefrom and causing it to change direction to a generally radial flow direction; and
    providing a second stage fan downstream of said plurality of guide vanes for receiving the flow of air therefrom and moving it over said stator and rotor for cooling thereof.

9. A method as set forth in claim 8 wherein said first stage fan is a centrifugal fan.

10. A method as set forth in claim 9 wherein said centrifugal fan is of the backward curved type.

11. A method as set forth in claim 8 wherein said second stage fan is of the centrifugal type.

12. A method as set forth in claim 11 wherein said centrifugal fan is of the backward curved type.

13. A generator of the type having a casing with a stationary stator and a shaft mounted rotor mounted therein, comprising:
    at least one air inlet disposed near one end of said housing and at least one air outlet disposed near the other end thereof;
    a first stage fan disposed within said casing and adjacent said at least one air inlet, said first stage fan being adapted to be driven by said shaft to draw ambient air in through said at least one air inlet and raise the pressure thereof to an intermediate level; and
    a second stage fan disposed within said casing, between said first stage fan and said rotor, said second stage fan being rotatable by said shaft for receiving airflow from said first stage fan and raising the pressure thereof to a higher pressure, with the higher pressure air than passing through said casing to cool the rotor and stator prior to its flowing from said at least one air outlet.

14. A generator as set forth in claim 13 including a plurality of guide vanes disposed between said first and second stage fans for the purpose of de-swirling the airflow from said first stage fan prior to its flowing to said second stage fan.

15. A generator as set forth in claim 13 wherein said first stage fan is of the centrifugal type.

16. A generator as set forth in claim 15 wherein said centrifugal fan is of the backward curved type.

17. A generator as set forth in claim 13 wherein said second stage fan is of the centrifugal type.

18. A generator as set forth in claim 17 wherein said centrifugal fan is of the backward curved type.

* * * * *